United States Patent
Ashok et al.

(10) Patent No.: US 9,998,912 B2
(45) Date of Patent: Jun. 12, 2018

(54) POLICY-DRIVEN AGGREGATED NETWORK DATA USE IN MOBILE DEVICES

(71) Applicant: International Business Machines Corporation, Armonk, NY (US)

(72) Inventors: Shamsundar Ashok, Austin, TX (US); Rahul Chandrakar, Bangalore (IN); Anjil R. Chinnapatlolla, Bangalore (IN); Gopalakrishna Naveen, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 15/081,168

(22) Filed: Mar. 25, 2016

(65) Prior Publication Data

US 2017/0280316 A1 Sep. 28, 2017

(51) Int. Cl.
*H04M 3/00* (2006.01)
*H04W 8/18* (2009.01)

(52) U.S. Cl.
CPC .................. *H04W 8/183* (2013.01)

(58) Field of Classification Search
CPC .................................. H04W 8/183
USPC .......................... 455/418; 370/338
See application file for complete search history.

(56) References Cited

U.S. PATENT DOCUMENTS

| | | | |
|---|---|---|---|
| 8,666,400 B2 | 3/2014 | Islam et al. | |
| 8,713,090 B2 | 4/2014 | Sadovsky et al. | |
| 8,724,484 B2 | 5/2014 | Jones et al. | |
| 8,913,610 B2 | 12/2014 | Saavedra | |
| 9,084,107 B2 | 7/2015 | Cai et al. | |
| 9,137,739 B2 | 9/2015 | Raleigh | |
| 9,215,613 B2 | 12/2015 | Raleigh et al. | |
| 2006/0288404 A1* | 12/2006 | Kirshnan | G06F 8/67 726/5 |
| 2013/0044705 A1 | 2/2013 | Akhtar et al. | |
| 2014/0029420 A1 | 1/2014 | Jeong et al. | |
| 2014/0071854 A1 | 3/2014 | Xiang et al. | |
| 2015/0029917 A1 | 1/2015 | Kim | |
| 2015/0146523 A1* | 5/2015 | Yang | H04L 45/306 370/230 |

(Continued)

OTHER PUBLICATIONS

Bui et al.; "GreenBag: Energy-Efficient Bandwidth Aggregation for Real-time Streaming in Heterogeneous Mobile Wireless Networks", 2013 IEEE 34th Real-Time Systems Symposium, Dec. 3-6, 2013, pp. 57-67.

(Continued)

*Primary Examiner* — Marcos Batista
(74) *Attorney, Agent, or Firm* — Patterson + Sheridan, LLP (57) ABSTRACT

Systems, methods, and computer program products to perform an operation comprising receiving a first packet for transport via a mobile device, identifying a first policy, of a plurality of policies, specifying a plurality of rules for transmitting data packets via a plurality of network interfaces of the mobile device, applying the rules of the first policy to a plurality of attributes of each network interface to select at least a first one of the plurality of interfaces of the mobile device, and transporting the first packet via the at least the first one of the plurality of interfaces of the mobile device.

20 Claims, 5 Drawing Sheets

(56) References Cited

U.S. PATENT DOCUMENTS

2015/0245409 A1 8/2015 Medapalli
2015/0296415 A1 10/2015 Ling et al.

OTHER PUBLICATIONS

Nirjon et al.; "MultiNets: Policy Oriented Real-Time Switching of Wireless Interfaces on Mobile Devices", 2012 IEEE 18th Real Time and Embedded Technology and Applications Symposium, Apr. 16-19, 2012, pp. 251-260.
A. Sapio et al., "MAPPER: A Mobile Application Personal Policy Enforcement Router for Enterprise Networks", IEEE 2014 Third European Workshop on Software Defined Networks, Budapest, Hungary, Sep. 1-3, 2014, pp. 131-132 <https://www.computer.org/csdl/proceedings/ewsdn/2014/6919/00/6919a131.pdf>.
Connectify Hotspot 2016, retrieved Mar. 23, 2016, 8 pages. <http://www.connectify.me/>.
Alcatel-Lucent Wireless Unified Networks, retrieved Mar. 23, 2016, 8 pages. <https://www.alcatel-lucent.com/solutions/wireless-unified-networks>.

* cited by examiner

POLICY-DRIVEN AGGREGATED NETWORK DATA USE IN MOBILE DEVICES

BACKGROUND

The present invention relates to mobile computing devices, and more specifically, to policy-driven aggregated network data use in mobile computing devices.

Modern mobile devices include multiple network interfaces, such as wireless local area network (WLAN) connections (also referred to as Wi-Fi®) and multiple cellular network data connections (such as 2G, 3G, and 4G connections). However, these devices only use one of the available interfaces at any given time for data transfer, regardless of how fast or reliable the connection is. Furthermore, users place different priorities on their traffic types, rendering a one-connection-fits-all approach inappropriate. For example, a user may wish to rapidly download large files, and place an increased priority on these traffic types. Another user may wish to avoid the costs associated with data transfer incurred after a cellular data cap is exceeded, therefore placing an emphasis on keeping costs low.

SUMMARY

According to one embodiment, a method comprises receiving a first packet for transport via a mobile device, identifying a first policy, of a plurality of policies, specifying a plurality of rules for transmitting data packets via a plurality of network interfaces of the mobile device, applying the rules of the first policy to a plurality of attributes of each network interface to select at least a first one of the plurality of interfaces of the mobile device, and transporting the first packet via the at least the first one of the plurality of interfaces of the mobile device.

According to another embodiment, a system comprises one or more computer processors, and a memory containing a program which when executed by the processors performs an operation comprising receiving a first packet for transport via a mobile device, identifying a first policy, of a plurality of policies, specifying a plurality of rules for transmitting data packets via a plurality of network interfaces of the mobile device, applying the rules of the first policy to a plurality of attributes of each network interface to select at least a first one of the plurality of interfaces of the mobile device, and transporting the first packet via the at least the first one of the plurality of interfaces of the mobile device.

According to another embodiment, a computer program product comprises a computer-readable storage medium having computer-readable program code embodied therewith, the computer-readable program code executable by one or more computer processors to perform an operation comprising receiving a first packet for transport via a mobile device, identifying a first policy, of a plurality of policies, specifying a plurality of rules for transmitting data packets via a plurality of network interfaces of the mobile device, applying the rules of the first policy to a plurality of attributes of each network interface to select at least a first one of the plurality of interfaces of the mobile device, and transporting the first packet via the at least the first one of the plurality of interfaces of the mobile device.

DETAILED DESCRIPTION

Embodiments disclosed herein provide policy-based aggregated network data use of the multiple network interfaces of a mobile device. Each mobile device may support a plurality of different policies (e.g., predefined and user-defined policies), which, when applied, aggregate the different network interfaces without the need for a point of aggregation external to the mobile device (such as an application or specialized hardware). For example, a first policy may be tailored to providing maximum speeds on the mobile device. When the first policy is applied, the mobile device may use a predefined number of the fastest network interfaces to send and receive data. As another example, a second policy may be tailored to limiting the cost of transferring data to and from the mobile device. When the mobile device applies the second policy, the mobile device may use the most cost effective network interfaces to send and receive data. For example, if a 4G data connection costs $0.01/MB, while a 3G data connection costs $0.00001/MB, the mobile device may use a combination of the 3G and 4G connections to send/receive data under the second policy while minimizing costs.

By providing policy-based network aggregation on mobile devices, embodiments disclosed herein abstract the selection of network interfaces being used from the applications executing on the mobile device. Users may also have more control over the user experiences on the mobile device, selecting from any number of configurable priorities. Similarly, users may experience an improved overall speed for network data transmissions, as using multiple slower network connections provides a perceived increase of speed relative to a single slower connection.

Figure 1:
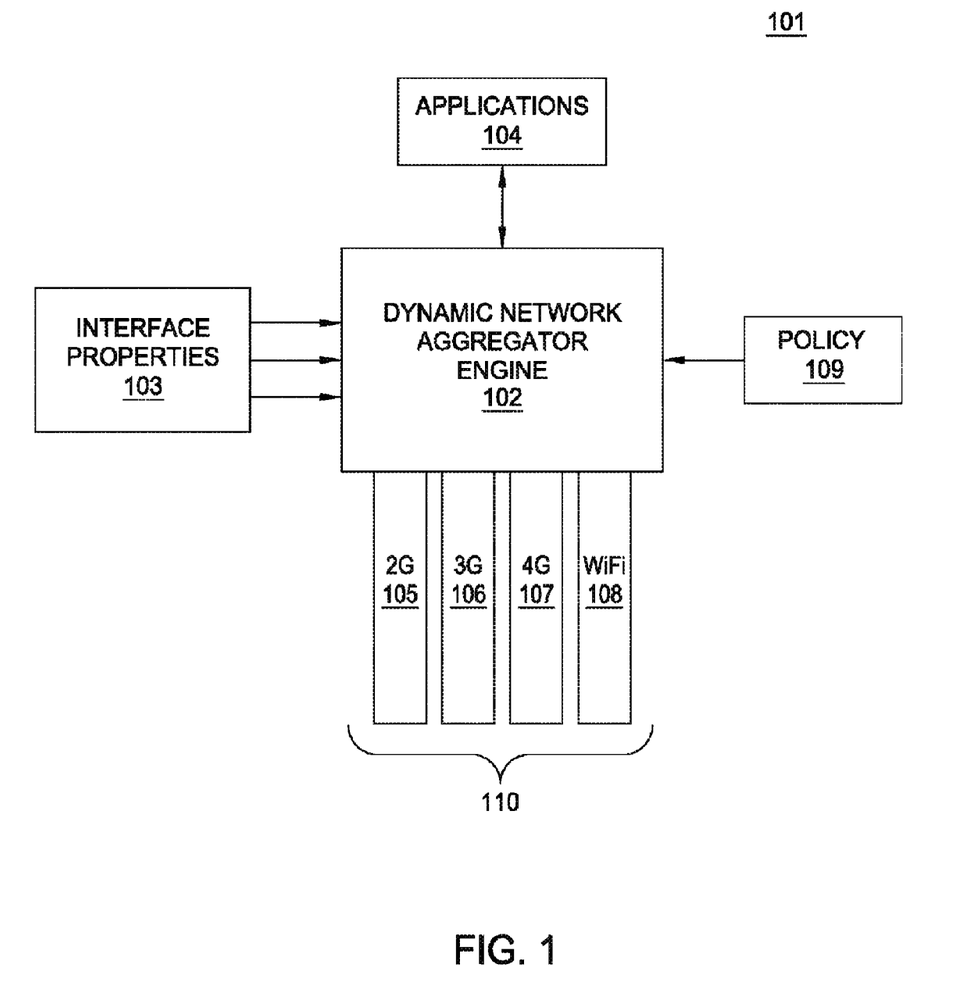
FIG. 1 is a logical view of an example mobile device that implements policy-driven aggregated network data use, according to one embodiment.

FIG. 1 is a logical view of an example mobile device 101 that implements policy-driven aggregated network data use, according to one embodiment. As shown, the mobile device 101 includes a plurality of network interfaces 110. More specifically, the mobile device 101 includes cellular network data interfaces, including the second generation (2G) interface 105, third generation (3G) interface 106, and the fourth generation (4G) interface 107. The cellular network data interfaces 105-107 may be used to connect to the same or different cellular network providers. The mobile device 101 further includes a Wi-Fi interface 108, which may be used to connect to wireless local area networks (WLANs). Generally, the mobile device 101 may include any number and type of network interfaces 110, and the network connections depicted in FIG. 1 should not be considered limiting of the disclosure. Additional example network interfaces 110 include Bluetooth® interfaces, near field communications (NFC) interfaces, and the like.

As shown, the mobile device 101 also includes a dynamic network aggregator engine 102, which is configured to control access to the of network interfaces 110 by applications 104 executing on the mobile device 101. The applications 104 may include any type of executable code, such as programs, operating system components, the operating system (not pictured), and the like. Generally, the dynamic network aggregator engine 102 may select one or more of the network interfaces 110 to send (and/or receive) data on behalf of the applications 104 based on a selected policy 109 and one or more interface properties 103. Generally, the selected policy 109 may be one of a plurality of policies 109 provided on the mobile device. The policy 109 may be, for example and without limitation, a speed policy which attempts to provide maximum speeds, an economy policy which attempts to limit the user's cost associated with using the network interfaces 110, a battery policy which attempts to preserve the battery life of the mobile device 101 while using the network interfaces 110, hybrid policies that mix elements of other policies, and user-defined policies. The interface properties 103 are attributes of each network interface 110, such as a data cap for each interface (if applicable), a cost per data unit for each interface (if applicable), a speed of the interface (which may be dynamically determined using speed tests), an amount of battery required to transmit a unit of data, and the like.

Therefore, when an application 104 has data that targets an external device, the dynamic network aggregator engine 102 may select, based on one of the policies 109 and interface properties 103, one or more of the network interfaces 110 to transmit the data. For example, if a battery life maximization policy 109 is currently selected, the dynamic network aggregator engine 102 may select the network interfaces 110, such as the Wi-Fi interface 108, which uses the least amount of battery to transmit a unit of data. As another example, if a maximum speed policy 109 is currently selected, the dynamic network aggregator engine 102 may select the 4G interface 107 based on the observed bandwidth, latency, and throughput of the interfaces 110. When the dynamic network aggregator engine 102 selects the appropriate interfaces, subsequent responses (and other associated data) may be received via the same interfaces, thereby causing both transmitted and received data to adhere to the selected policy. In some embodiments, a policy 109 may not be selected when an application 104 indicates it has data for transmissions. In such embodiments, the dynamic network aggregator engine 102 may dynamically select a policy based on one or more criteria, such as the time of day, the nature or volume of the data being transferred, the target to which the data is being transferred, the available networks at that time, etc.

Figure 2A:
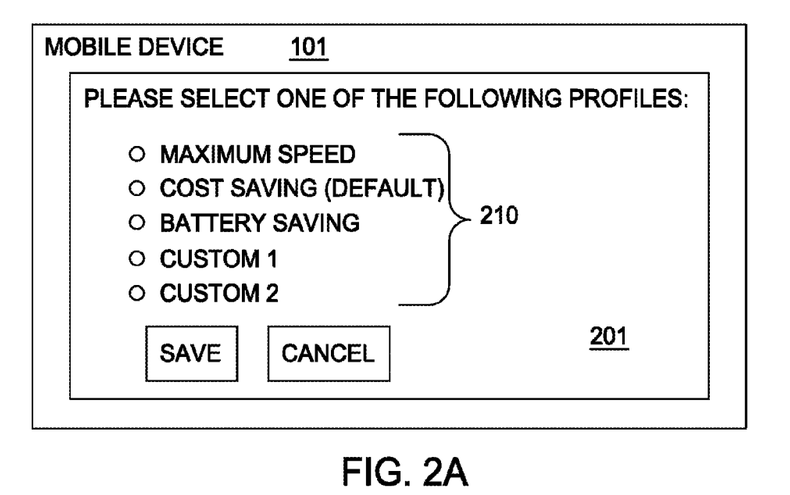
FIGS. 2A-2B illustrate graphical user interfaces for policy-driven aggregated network data use in mobile devices, according to one embodiment.

FIG. 2A illustrates a graphical user interface (GUI) 201 for policy-driven aggregated network data use in a mobile device 101, according to one embodiment. As shown, the GUI 201 displays a group of policies 210, namely a maximum speed policy, a cost saving policy, a battery saving policy, and two custom policies (custom 1 and custom 2). A user may select one of the policies 210 for use in the mobile device 101. As shown, one of the policies (the cost saving policy) may be a default policy that is applied by the mobile device 101 if the user does not select a different policy. In at least one embodiment, the dynamic network aggregator engine 102 provides the GUI 201, and applies the user-selected (or default) policy to network traffic targeting the network interfaces 110. The custom policies may be user-defined, or programmatically generated by the dynamic network aggregator engine 102. For example, the dynamic network aggregator engine 102 may monitor the history of data use on a mobile device 101 (which may be further refined on a per-user basis). Based on the data use, the dynamic network aggregator engine 102 may generate a policy that is tailored to the types and amount of data traffic observed on the mobile device 101. Therefore, for example, if a user has a high data cap and watches numerous videos, the dynamic network aggregator engine 102 may create a custom profile that seeks maximum speeds to improve the user experience without regard for the data cap (at least until the data usage exceeds a predefined threshold relative to the data cap).

Figure 2B:
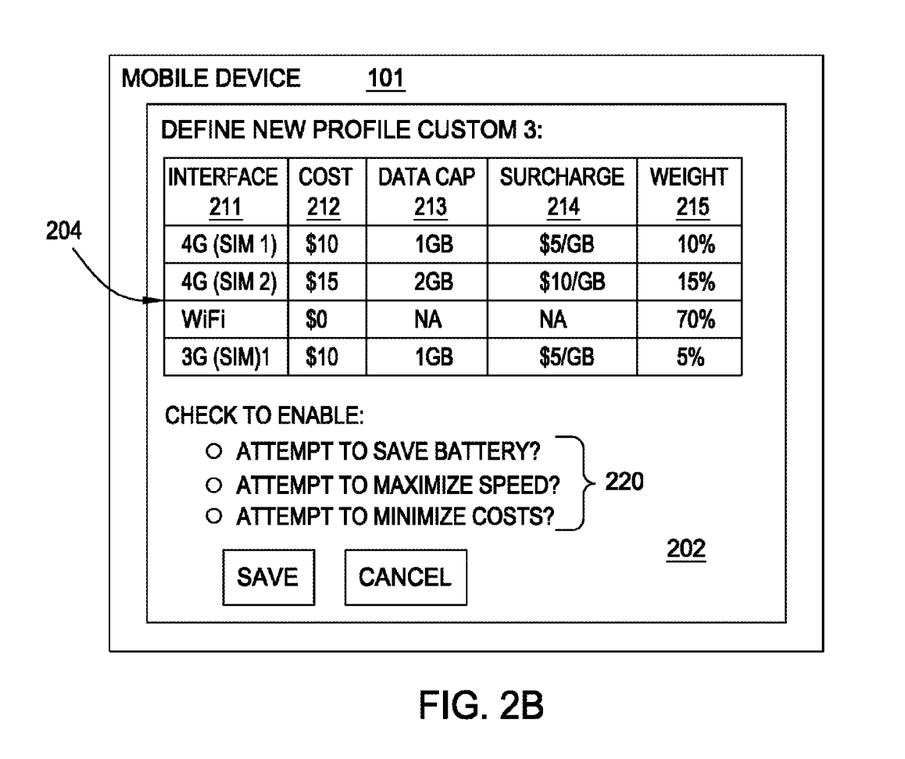

FIG. 2B illustrates a GUI 202 for defining a policy, according to one embodiment. As shown, the GUI 202 depicts a table 204 of example values provided by a user to define a new policy (Custom 3). The table 204 allows the user to specify each network interface 110 in the mobile device 101, as well as properties for each interface 110. The table 204 includes an interface column 211, a cost column 212, a data cap column 213, a surcharge column 214, and a weight column 215. The interface column 211 allows a user to enter (e.g., by selecting from a drop-down menu) different network interfaces 110 of the mobile device. For example, as shown, the user has entered two different 4G interfaces 211, as the mobile device has two 4G connections (that may connect to the networks of different cellular data providers). The cost column 212 may correspond to a monthly cost associated with maintaining the respective data connection via the interface 211. The data cap 213 may correspond to a maximum amount of data the mobile device 101 may transmit using the interface 211 without incurring a surcharge. The surcharge 214 may correspond to a surcharge owed by the user if the interface 211 exceeds the data cap 213. The weight column 215 allows the user to define weight values for each interface. For example, as shown, the user has specified to allocate 70% of data units to the Wi-Fi network interface. Therefore, the dynamic network aggregator engine 102 may allocate approximately 70% of data units to the Wi-Fi interface. The dynamic network aggregator engine 102 may allocate the remaining 30% according to the respective weights of the other network interfaces in the device 101, such that the total across all interfaces equals 100%. In one embodiment, if a user-specified parameter conflicts with a policy or interface property, the dynamic network aggregator engine 102 may modify the user-specified parameters to eliminate conflicts. For example, if a power-saving option is selected, but the user has specified a weight which allocates a large portion of traffic to an interface which consumes large amounts of battery power, the dynamic network aggregator engine 102 may modify the weight for the interface accordingly.

Although not pictured, the table 204 may include fields for battery use per unit of data and transfer speeds (which may include latency, bandwidth, and throughput), which may be entered by the user, or dynamically determined by the dynamic network aggregator engine 102. As shown, the user may also select one or more of a set of options 220 that can be applied to the user-defined policy. As shown, the options 220 include an option to attempt to save battery, an option to attempt to maximize speeds, and an option to attempt to minimize costs. The dynamic network aggregator engine 102 may apply the selected options when the user saves the new policy, and apply the selected options when data is transmitted via the network interfaces 110. More generally, the options 220 may include any number and type of options, such as whether to disable background data use, associated applications (e.g., video-intensive applications may be associated with cost saving plan), and the like.

Figure 3:
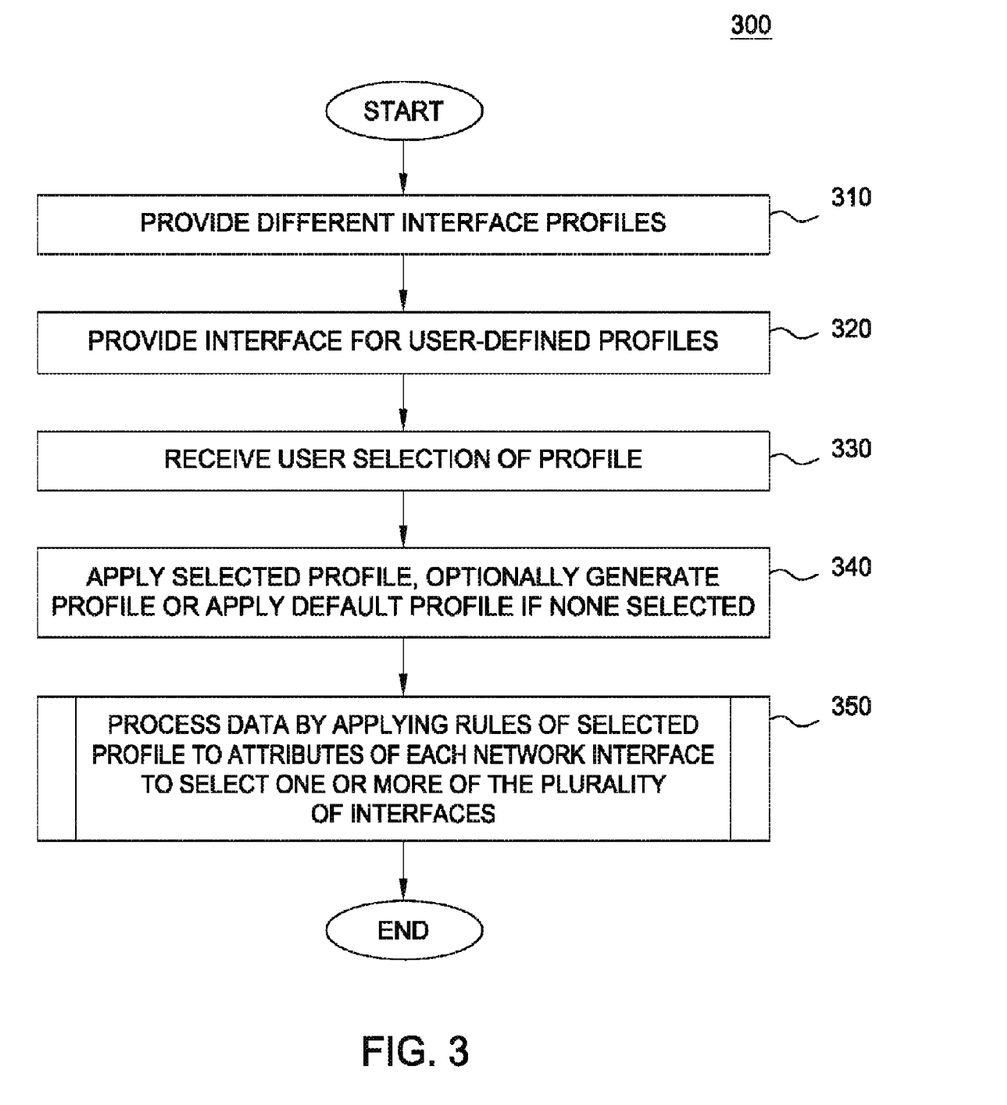
FIG. 3 is a flow chart illustrating a method for policy-driven aggregated network data use in mobile devices, according to one embodiment.

FIG. 3 is a flow chart illustrating a method 300 for policy-driven aggregated network data use in mobile devices, according to one embodiment. Generally, the method 300 provides mobile devices which select one or more network interfaces to transmit data packets based on a selected policy (either currently selected or dynamically selected in real time) and attributes of each network interface, providing a user with more control over their device while abstracting the details from applications executing on the mobile device. In at least one embodiment, the dynamic network aggregator engine 102 performs the method 300. As shown, the method 300 begins at block 310, where the dynamic network aggregator engine 102 provides a plurality of different network interface profiles on a mobile device. For example, a first profile may be a speed profile, which considers all available network interfaces, and may cause the dynamic network aggregator engine 102 to distribute the network load across all of the interfaces. Under the speed profile, the dynamic network aggregator engine 102 may allocate the network data load based on a weight associated with each network interface. The weight may be based on a determined speed of the respective interface. Another example profile includes an economy profile which causes the dynamic network aggregator engine 102 to distribute the load according to the cost of transmitting each packet via each respective interface. Still another network profile includes a battery saving mode, which causes the dynamic network aggregator engine 102 to allocate packets based on the amount of energy used by each network interface to transmit data packets.

In some cases a user may prefer to create a custom profile, rather than selecting from the predefined profiles made available at step 310. In that event, a user may click a button on the GUI 202 explicitly requesting a custom profile, thereby causing the method 300 to proceed to block 320. At block 320, the dynamic network aggregator engine 102 may provide a user interface, such as the GUI 202, allowing users to define custom profiles. At block 330, the dynamic network aggregator engine 102 may receive selection of a profile. At block 340, the dynamic network aggregator engine 102 may apply the selected profile. In one embodiment, if the user does not select a profile, the dynamic network aggregator engine 102 may generate a profile based on the use history for the device. In another embodiment, the dynamic network aggregator engine 102 may apply a default profile if the user does not select a profile. Alternatively, the policy may not be preselected, but rather be selected dynamically in real time once a request to transfer data is initiated. The context of the request may then determine which policy is ultimately selected. At step 350, the dynamic network aggregator engine 102 may process data by applying rules of the selected profile to attributes of each network interface, to select one or more of the plurality of interfaces to send and receive data. For example, if a maximum speed profile is selected, the dynamic network aggregator engine 102 may allocate 80% of data to the fastest network interface on the device, while allocating 10% to each of two slower network interfaces on the device.

Figure 4:
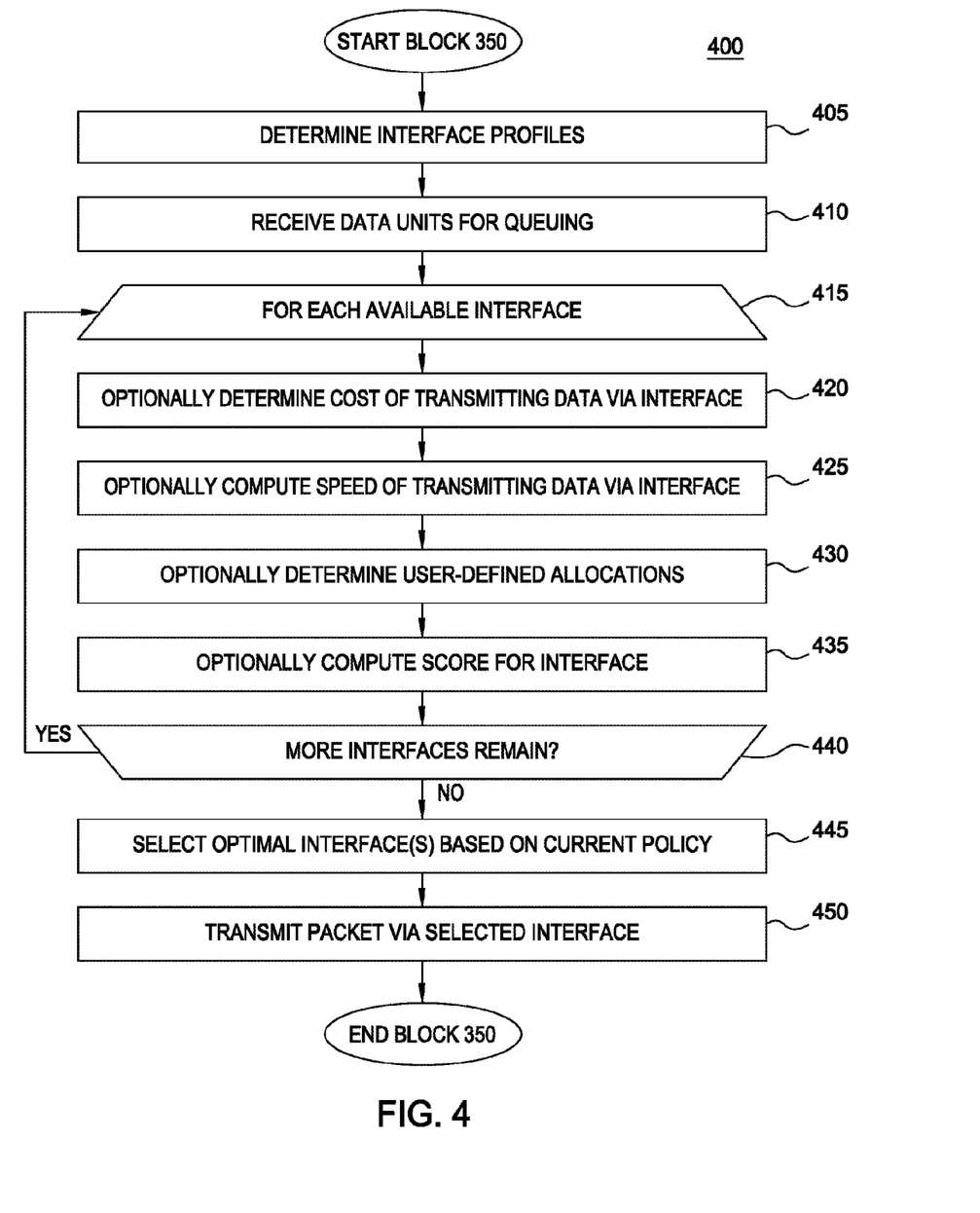
FIG. 4 is a flow chart illustrating a method to process data by applying rules of the selected profile to attributes of each network interface, according to one embodiment.

FIG. 4 is a flow chart illustrating a method 400 corresponding to block 350 to process data by applying rules of the selected profile to attributes of each network interface. As shown, the method 400 begins at block 405, where the dynamic network aggregator engine 102 may determine the properties of each network interface. For example, the properties may include observed and actual data transfer rates, costs associated with each interface, data caps, battery energy used by each interface, and the like. At block 410, the dynamic network aggregator engine 102 may receive one or more data units (such as a packet, frame, and the like) for queuing. At block 415, the dynamic network aggregator engine 102 executes a loop including blocks 420-435 for each available network interface on the mobile device.

At block 420, the dynamic network aggregator engine 102 may optionally determine the cost of transmitting one or more data units via the current interface. The cost may be based on a computed cost per unit, which may include any surcharges imposed by a network provider. At block 425, the dynamic network aggregator engine 102 may optionally determine the speed of transmitting the data units via the current network interface. The speed may include bandwidth, throughput, and latency values that are observed based on prior transmissions, or computed using one or more network-based speed test services. At block 430, the dynamic network aggregator engine 102 may determine whether any user-defined allocation weights have been defined. For example, the user may expressly require that 50% of all data traffic is transmitted via the 4G interface for mobile provider X, and 25% via the 3G interface for mobile provider Y. At block 435, the dynamic network aggregator engine 102 may compute a score for the interface. The score may be based on one or more of the speed of the interface, the cost per unit of the interface, the battery use of the interface, the currently selected policy, and the like. Generally, the dynamic network aggregator engine 102 may use any suitable algorithm to compute the score for the interface. The algorithm may be based on the current policy selected. For example, an algorithm associated with a maximum speed policy may weigh the speed of the interface more heavily than other factors. Similarly, an algorithm associated with the battery life policy may weigh the energy use of the interface more heavily than other factors.

At block 440, the dynamic network aggregator engine 102 may determine whether more network interfaces remain. If more interfaces remain, the method returns to block 415. Otherwise, the method proceeds to block 445, where the dynamic network aggregator engine 102 selects the optimal interfaces based on the current policy. In at least one embodiment, the dynamic network aggregator engine 102 selects the optimal interface based on the scores for each interface. For example, if a first interface has a score of 95 (on a scale from 0-100), a second interface has a score of 90, and a third interface has a score of 60, the dynamic network aggregator engine 102 may select the first and second interfaces based on their respective scores. In another embodiment, the dynamic network aggregator engine 102 may select the interface based on user-defined or policy-specified allocations (such as an allocation requiring 75% of traffic to be transmitted via Wi-Fi). At block 450, the dynamic network aggregator engine 102 may transmit the packet via the selected interface(s).

Figure 5:
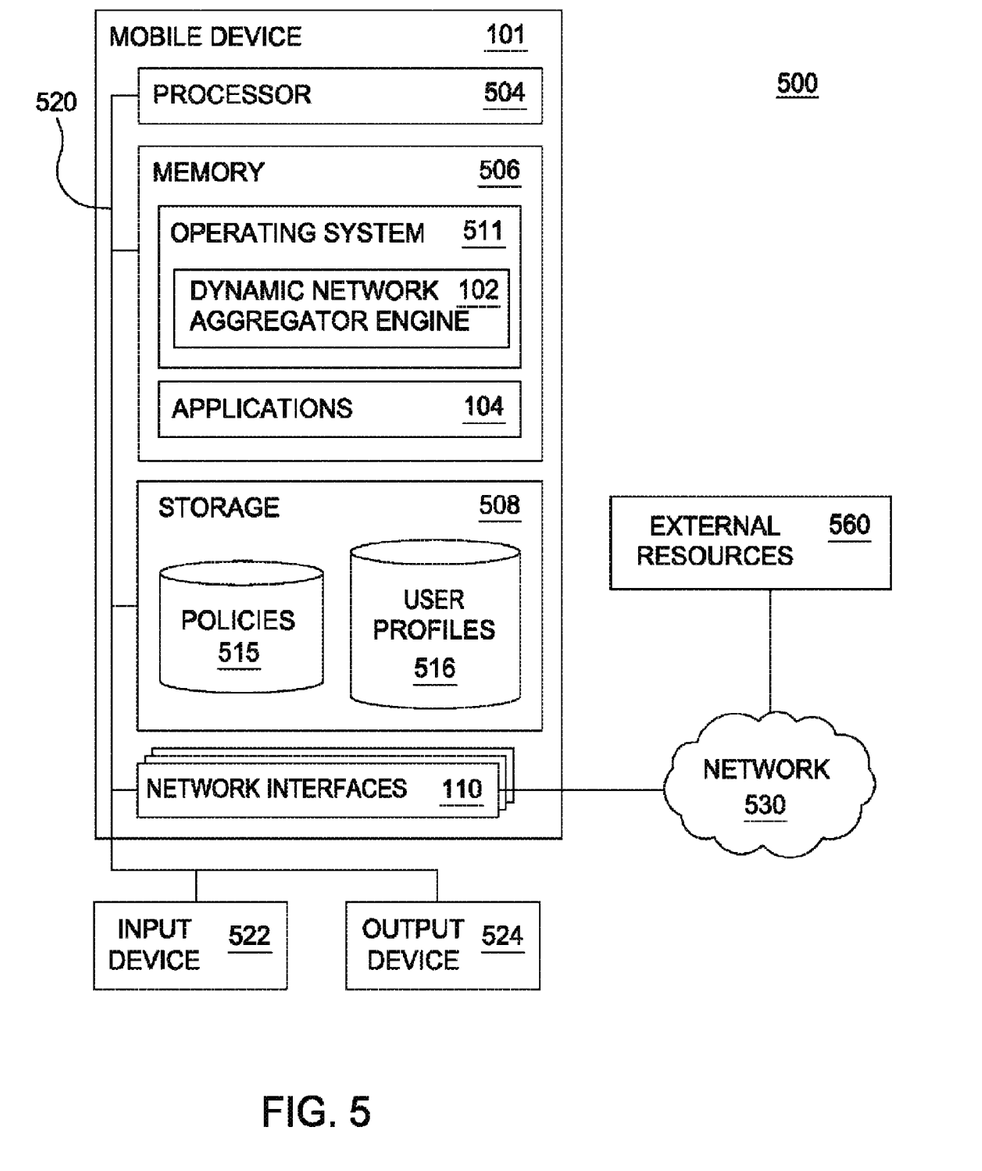
FIG. 5 is a block diagram illustrating a mobile device which implements policy-driven aggregated network data use, according to one embodiment.

FIG. 5 is a block diagram illustrating a system 500 which implements policy-driven aggregated network data use, according to one embodiment. The networked system 500 includes the mobile device 101. Examples of a mobile device 101 include, without limitation, smart phones, tablets, e-readers, laptop computers, portable game players, media playback devices, and the like. The mobile device 101 may also be connected to other computers via one or more networks 530. In general, the network 530 may be a telecommunications network and/or a wide area network (WAN). In a particular embodiment, the network 530 is the Internet.

The mobile device 101 generally includes a processor 504 which obtains instructions and data via a bus 520 from a memory 506 and/or a storage 508. The mobile device 101 may also include one or more network interface devices 110, input devices 522, and output devices 524 connected to the bus 520. The mobile device 101 is generally under the control of an operating system 511. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface devices 110 may be any type of network communications device allowing the mobile device 101 to communicate with other computers via the network 530.

The storage 508 is representative of hard-disk drives, solid state drives, flash memory devices, optical media and the like. Generally, the storage 508 stores application programs and data for use by the mobile device 101. In addition, the memory 506 and the storage 508 may be considered to include memory physically located elsewhere; for example, on another computer coupled to the mobile device 101 via the bus 520.

The input device 522 may be any device for providing input to the mobile device 101. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the mobile device 101. The output device 524 may include output devices such as monitors, touch screen displays, and so on.

As shown, the memory 506 contains the dynamic network aggregator engine 102, which is configured to provide policy-based aggregated use of the network interfaces 110. As shown, the dynamic network aggregator engine 102 may be a component of the operating system 511. Generally, the dynamic network aggregator engine 102 may manage use of the network interfaces 110 based on one or more policies 515. The dynamic network aggregator engine 102 may apply the policies 515 in light of the attributes of the network interfaces 110. Doing so allows the dynamic network aggregator engine 102 to determine the optimal interface for transmitting data to/from the external resources 560 via the network 530.

As shown, the storage 508 contains the policies 515 and user profiles 516. Generally, the profiles 515 include different rules that are used to select one or more of the network interfaces 110 to transmit data. The rules include, without limitation, weights for allocating data units to each network interface 110, algorithms used to compute scores for each interface, and general policy rules (such as whether to save costs, battery life, and the like). The policies 515 include speed policies, battery life policies, cost saving policies, user-specific dynamically generated profiles, and user-generated profiles. The user profiles 516 include user-specific preferences, attributes, and use data describing the types and amount of traffic transmitted by each user of the mobile device 101. Among other things, the historical information contained in the user profiles may be used to dynamically generate policies when no other policy is explicitly selected, as was described above. The external resources 560 include any type of computing resources available via the network 530. Examples of the external resources include files, web pages, web services, and the like.

Advantageously, embodiments disclosed herein provide mobile devices which use different network interfaces based on user-selected policies. Generally, the mobile devices may apply the policies to improve the overall experience for the user. For example, the improved experience may include faster browsing speeds, lower costs, and longer battery life. Furthermore, the network interface selection is abstracted from any applications executing on the mobile device. Therefore, the association between a given application and a given network interface can be dynamically determined based on network interface attributes and the policies.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the foregoing features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving a first packet for transport via a mobile device;
   identifying a first policy, of a plurality of policies, specifying a plurality of rules for transmitting data packets via a plurality of network interfaces of the mobile device;
   computing a respective score for each network interface based at least on: (i) a plurality of attributes of each respective network interface, (ii) a type of the first packet, (iii) a service associated with the first packet, and (iv) an amount of remaining battery life of the mobile device;
   selecting a first one of the plurality of interfaces of the mobile device based on the computed scores and the rules of the first policy; and
   transporting the first packet via the first one of the plurality of interfaces of the mobile device.

2. The method of claim 1, wherein selecting the first one of the plurality of network interfaces further comprises:
ranking each of the plurality of network interfaces based on the respective scores; and
selecting the first one of the plurality of interfaces based on the ranked plurality of network interfaces.

3. The method of claim 2, wherein the attributes of the network interfaces comprise: (i) a bandwidth, (ii) a latency, (iii) a speed, (iv) a cost per data unit, (v) a data cap, and (vi) a battery use associated with transmitting data packets.

4. The method of claim 1, further comprising:
receiving a plurality of data packets for transmission via the plurality of network interfaces of the mobile device;
queuing each of the plurality of data packets to the plurality of network interfaces based on the rules of the first policy; and
transmitting the queued plurality of data packets via the respective network interface.

5. The method of claim 1, further comprising:
providing the plurality of policies on the mobile device, wherein the plurality of policies include at least one user-defined policy; and
receiving user input specifying to apply the first policy to application data transmitted by the mobile device.

6. The method of claim 1, wherein the plurality of network interfaces comprise: (i) at least two cellular network interfaces associated with a first provider, (ii) at least two cellular network interfaces associated with a second provider, and (iii) a wireless local area network (WLAN) interface, wherein a first policy of the plurality of policies comprises a battery saving policy configured to preserve a battery life of the mobile device relative to the other polices, wherein a second policy of the plurality of policies comprises a speed policy configured to transmit and receive data packets at a maximum rate of speed relative to the other policies, wherein a third policy of the plurality of policies comprises a cost policy configured to transmit data packets at a minimum cost relative to the other policies.

7. The method of claim 1, wherein an operating system of the mobile device applies the rules of the policy to select the first one of the network interfaces, wherein the first packet is generated by an application executing on the mobile device, wherein the operating system abstracts the selection of the first one of the network interfaces from the application, wherein the mobile device comprises one of: (i) a smartphone, (ii) a tablet computer, (iii) a laptop computer, (iv) a portable gaming device, (v) an e-reader, and (vi) a virtual reality device.

8. A mobile device, comprising:
a plurality of network interfaces;
one or more computer processors; and
a memory storing instructions which when executed by the processors performs an operation comprising:
receiving a first packet for transport via a mobile device;
identifying a first policy, of a plurality of policies, specifying a plurality of rules for transmitting data packets via a plurality of network interfaces of the mobile device;
computing a respective score for each network interface based at least on: (i) a plurality of attributes of each respective network interface, (ii) a type of the first packet, (iii) a service associated with the first packet, and (iv) an amount of remaining battery life of the mobile device;
selecting a first one of the plurality of interfaces of the mobile device based on the computed scores and the rules of the first policy; and
transporting the first packet via the first one of the plurality of interfaces of the mobile device.

9. The mobile device of claim 8, wherein selecting the first one of the plurality of network interfaces further comprises:
ranking each of the plurality of network interfaces based on the respective scores; and
selecting the first one of the plurality of interfaces based on the ranked plurality of network interfaces.

10. The mobile device of claim 9, wherein the attributes of the network interfaces comprise: (i) a bandwidth, (ii) a latency, (iii) a speed, (iv) a cost per data unit, (v) a data cap, and (vi) a battery use associated with transmitting data packets.

11. The mobile device of claim 8, the operation further comprising:
receiving a plurality of data packets for transmission via the plurality of network interfaces of the mobile device;
queuing each of the plurality of data packets to the plurality of network interfaces based on the rules of the first policy; and
transmitting the queued plurality of data packets via the respective network interface.

12. The mobile device of claim 8, the operation further comprising:
providing the plurality of policies on the mobile device, wherein the plurality of policies include at least one user-defined policy; and
receiving user input specifying to apply the first policy to application data transmitted by the mobile device.

13. The mobile device of claim 8, wherein the plurality of network interfaces comprise: (i) at least two cellular network interfaces associated with a first provider, (ii) at least two cellular network interfaces associated with a second provider, and (iii) a wireless local area network (WLAN) interface, wherein a first policy of the plurality of policies comprises a battery saving policy configured to preserve a battery life of the mobile device relative to the other polices, wherein a second policy of the plurality of policies comprises a speed policy configured to transmit and receive data packets at a maximum rate of speed relative to the other policies, wherein a third policy of the plurality of policies comprises a cost policy configured to transmit data packets at a minimum cost relative to the other policies.

14. The mobile device of claim 8, wherein an operating system of the mobile device applies the rules of the policy to select the first one of the network interfaces, wherein the first packet is generated by an application executing on the mobile device, wherein the operating system abstracts the selection of the first one of the network interfaces from the application, wherein the mobile device comprises one of: (i) a smartphone, (ii) a tablet computer, (iii) a laptop computer, (iv) a portable gaming device, (v) an e-reader, and (vi) a virtual reality device.

15. A computer program product, comprising:
a computer-readable storage medium having computer-readable program code embodied therewith, the computer-readable program code executable by one or more computer processors to perform an operation comprising:
receiving a first packet for transport via a mobile device;

identifying a first policy, of a plurality of policies, specifying a plurality of rules for transmitting data packets via a plurality of network interfaces of the mobile device;

computing a respective score for each network interface based at least on: (i) a plurality of attributes of each respective network interface, (ii) a type of the first packet, (iii) a service associated with the first packet, and (iv) an amount of remaining battery life of the mobile device;

selecting a first one of the plurality of interfaces of the mobile device based on the computed scores and the rules of the first policy; and transporting the first packet via the first one of the plurality of interfaces of the mobile device.

16. The computer program product of claim 15, wherein selecting the first one of the plurality of network interfaces further comprises:

ranking each of the plurality of network interfaces based on the respective scores; and selecting the first one of the plurality of interfaces based on the ranked plurality of network interfaces.

17. The computer program product of claim 16, wherein the attributes of the network interfaces comprise: (i) a bandwidth, (ii) a latency, (iii) a speed, (iv) a cost per data unit, (v) a data cap, and (vi) a battery use associated with transmitting data packets.

18. The computer program product of claim 15, the operation further comprising:

receiving a plurality of data packets for transmission via the plurality of network interfaces of the mobile device;

queuing each of the plurality of data packets to the plurality of network interfaces based on the rules of the first policy; and transmitting the queued plurality of data packets via the respective network interface.

19. The computer program product of claim 15, the operation further comprising:

providing the plurality of policies on the mobile device, wherein the plurality of policies include at least one user-defined policy; and receiving user input specifying to apply the first policy to application data transmitted by the mobile device.

20. The computer program product of claim 15, wherein the plurality of network interfaces comprise: (i) at least two cellular network interfaces associated with a first provider, (ii) at least two cellular network interfaces associated with a second provider, and (iii) a wireless local area network (WLAN) interface, wherein a first policy of the plurality of policies comprises a battery saving policy configured to preserve a battery life of the mobile device relative to the other polices, wherein a second policy of the plurality of policies comprises a speed policy configured to transmit and receive data packets at a maximum rate of speed relative to the other policies, wherein a third policy of the plurality of policies comprises a cost policy configured to transmit data packets at a minimum cost relative to the other policies, wherein an operating system of the mobile device applies the rules of the policy to select the first one of the network interfaces, wherein the first packet is generated by an application executing on the mobile device, wherein the operating system abstracts the selection of the first one of the network interfaces from the application, wherein the mobile device comprises one of: (i) a smartphone, (ii) a tablet computer, (iii) a laptop computer, (iv) a portable gaming device, (v) an e-reader, and (vi) a virtual reality device.

* * * * *